United States Patent [19]

Martinek

[11] Patent Number: 5,407,382
[45] Date of Patent: Apr. 18, 1995

[54] METHOD AND APPARATUS FOR SEVERING TUBULAR MATERIAL AROUND A MANDREL

[75] Inventor: Harold H. Martinek, Danville, Ill.

[73] Assignee: Teepak, Inc., Westchester, Ill.

[21] Appl. No.: 249,766

[22] Filed: May 26, 1994

[51] Int. Cl.6 .............................................. A22C 13/00
[52] U.S. Cl. .......................................... 452/29; 30/97; 30/103
[58] Field of Search ...................... 452/29, 131, 50, 34; 30/94, 97, 103, 108

[56] References Cited

U.S. PATENT DOCUMENTS

| | | | |
|---|---|---|---|
| 2,699,604 | 1/1955 | Ingwer et al. | 30/97 |
| 3,817,131 | 6/1974 | Norlander | 82/101 |
| 3,936,909 | 2/1976 | Carter | 452/29 |
| 3,942,221 | 3/1976 | Sipusic et al. | 17/42 |
| 3,993,231 | 11/1976 | Monteiro et al. | 225/96 |
| 4,052,770 | 10/1977 | Asquith | 17/42 |
| 4,118,830 | 10/1978 | Weiland | 452/131 |
| 4,414,707 | 11/1983 | Koken | 452/50 |
| 4,622,718 | 11/1986 | Glanz et al. | 452/29 |
| 4,637,095 | 1/1987 | Maruska | 452/50 |
| 4,693,149 | 9/1987 | Sireix | 82/53.1 |
| 4,708,044 | 11/1987 | Adams | 83/545 |
| 4,885,821 | 12/1989 | Farkonas | 452/29 |
| 4,919,025 | 4/1990 | Snyder | 83/54 |
| 4,941,378 | 7/1990 | Snyder | 83/350 |

FOREIGN PATENT DOCUMENTS

| | | |
|---|---|---|
| 2070999 | 3/1981 | United Kingdom . |
| 235975 | 6/1969 | U.S.S.R. . |
| 897544 | 1/1982 | U.S.S.R. . |
| 914289 | 3/1982 | U.S.S.R. . |

*Primary Examiner*—Willis Little
*Attorney, Agent, or Firm*—Michael L. Dunn

[57] ABSTRACT

A method for severing tubular material around a rigid mandrel. The method comprises piercing the film with a knife such that the edge of the knife faces away from the mandrel, rotating the knife about the mandrel in a direction toward the knife edge while cutting the tubular material from inside of the tubular material to the outside of the tubular material and continuing said rotating until the tubular material is completely severed. In a preferred embodiment the tubular material is held stationary from at least the time of said piercing until at least the time that the tubular material is completely severed. In a further preferred embodiment, the tubular material such as a food casing is inflated to provide a space between the tubular material and the mandrel. The invention further includes an apparatus for practicing the method of the invention.

7 Claims, 5 Drawing Sheets

METHOD AND APPARATUS FOR SEVERING TUBULAR MATERIAL AROUND A MANDREL

BACKGROUND OF THE INVENTION

This invention relates to methods and apparatus for severing tubular material and especially relates to such tubular materials, e.g., tubular films, on a mandrel such as might be found in a sausage casing shirring machine.

Numerous methods and apparatus are known for severing or separating tubes into sections. Examples of some of such methods and apparatus may for example be found in U.S. Pat. Nos. 3,817,131; 3,942,221; 3,993,231; 4,052,770; 4,693,149; 4,708,044; 4,885,821; 4,919,025; and 4,941,378. Numerous methods and apparatus have been designed to cut tubing in the absence of a mandrel or rod within the tube. Examples of such patents are U.S. Pat. Nos. 4,708,044; 4,919,025 and 4,941,378 and Soviet Invention Certificate 914,289. When an internal mandrel is present, it has been conventional to pull the tubing apart, especially when the tubing is of a thin film which is capable of being torn. Such methods are undesirable since they do not result in clean cuts, i.e., the cuts are uneven with undesirable hanging tabbed ends or depressions at the edge of the cut. This is true even when the tubing is first partially severed. Examples of such patents are U.S. Pat. Nos. 3,942,221; 3,993,231; 4,052,770 and 4,885,821. In order to avoid such uneven cuts, attempts have been made to completely cut the tubing about a mandrel. In order to accomplish that, a knife is projected into a cutting position and the tubing is rotated about its longitudinal axis, with or without the mandrel also in rotation, until the cut is obtained. Numerous problems have been associated with such an approach. In particular slippage of tubing on the mandrel in either the radial or longitudinal directions can cause uneven or incomplete cuts and in order to make complete cuts, the knife must penetrate the tube which, in the absence of complicated means or methods of avoidance, can cause the knife to score the mandrel. Examples of such severing methods are described in U.S. Pat. Nos. 3,817,131 and 4,693,149, and U.K. Patent Application 2,070,999.

Soviet Inventor's Certificates 235,975 and 897,544 disclose an apparatus which rotates a knife about the radial axis of a tube to be cut. The apparatus, however, has a number of shortcomings. In particular, to permit the knife to penetrate the tubing without damaging the mandrel, a depression is formed in the mandrel to accommodate the point of the knife. Such a depression has the disadvantage of being able to catch, hold and possibly tear tubing passing over the mandrel.

BRIEF DESCRIPTION OF THE INVENTION

Figure 1:
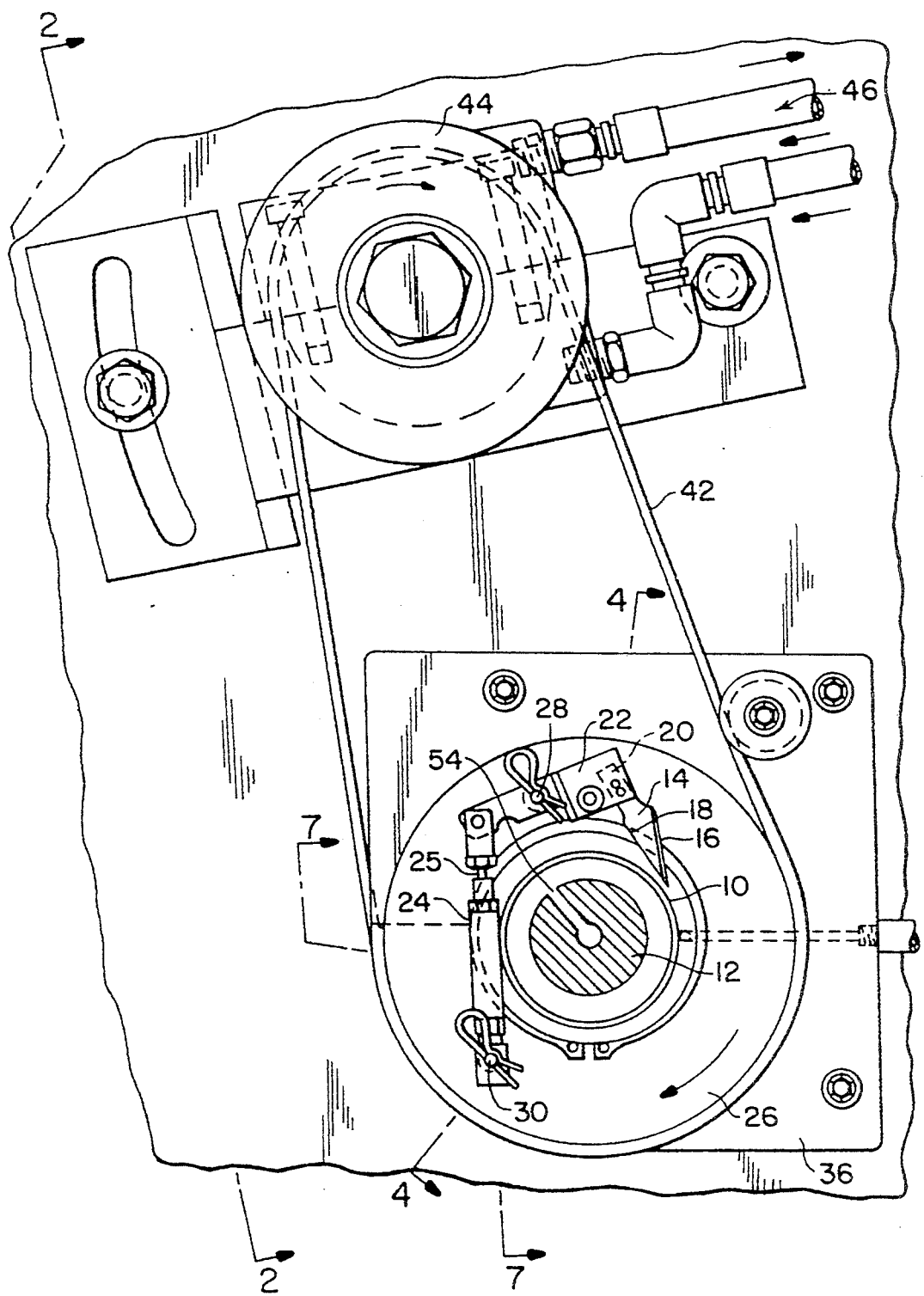
FIG. 1 shows an end view of a preferred embodiment of a tube severing apparatus in accordance with the present invention with the cutting knife in a withdrawn position.
Figure 2:
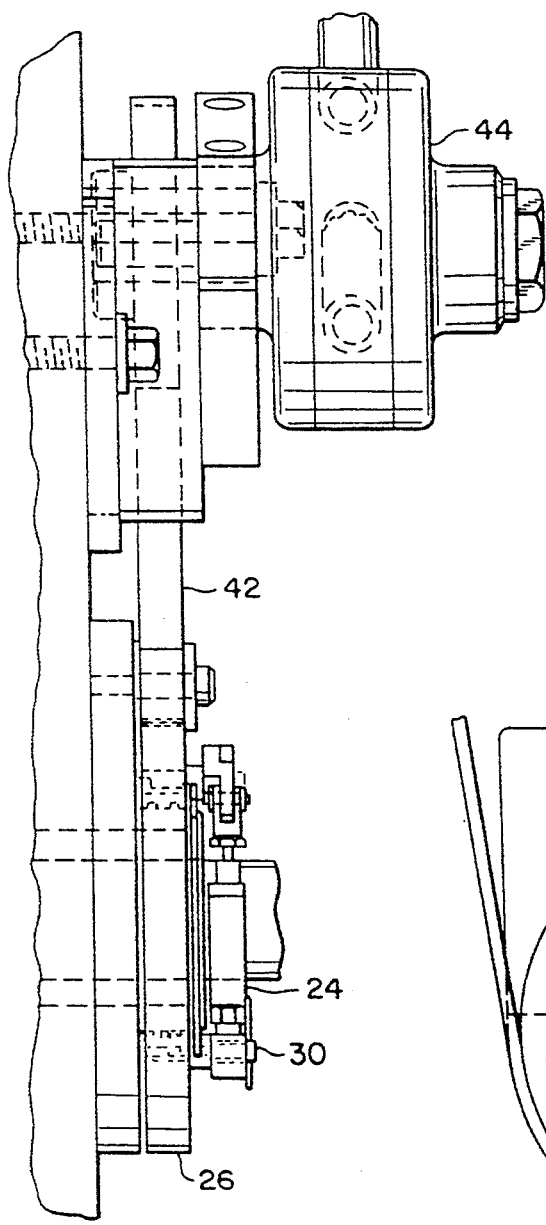
FIG. 2 shows a partial side view of apparatus of FIG. 1, taken on line 2—2 of FIG. 1.
Figure 3:
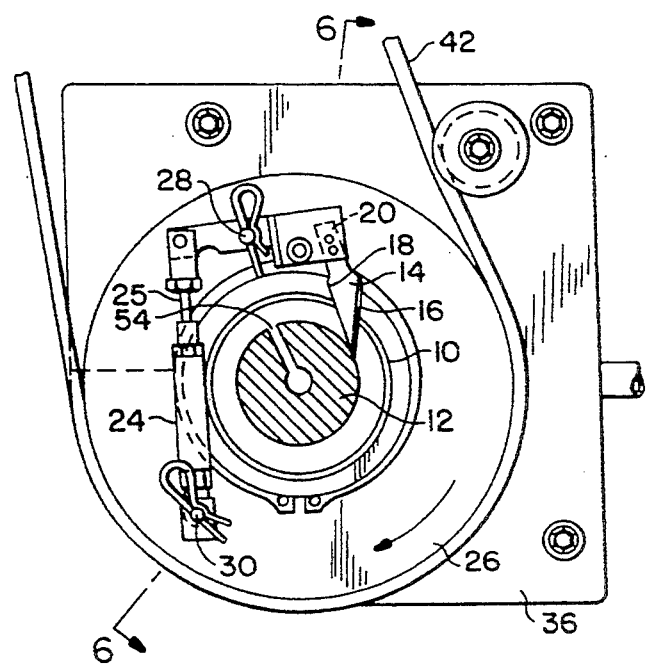
FIG. 3 is an end view of the knife portion of the apparatus of FIG. 1 with the knife blade in the cutting position.
Figure 4:
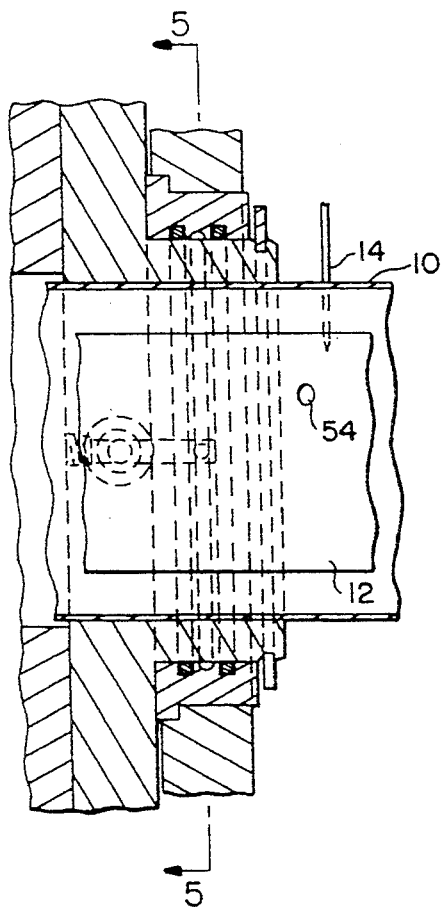
FIG. 4 is a cross sectional side view of apparatus of FIG. 1 taken on line 4—4 of FIG. 1.
Figure 6:
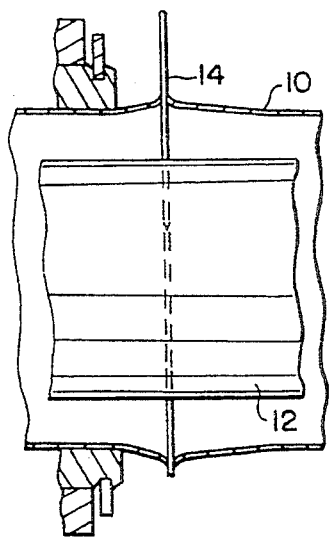
FIG. 6 is a simplified cross sectional view of the apparatus of FIG. 3 taken on line 6—6 of FIG. 3.

In accordance with the present invention there is therefore provided a method and apparatus for cutting a tubular material such as a tubular film on a mandrel, e.g., a sausage casing on a shirring machine, which overcomes the disadvantages of prior severing methods and apparatus as previously discussed.

In particular, the invention comprises a method for severing tubular material around a rigid mandrel. The method comprises piercing the film with a knife such that the cutting edge of the knife faces away from the mandrel, rotating the knife about the mandrel in a direction toward the knife edge while cutting the tubular material from inside of the tubular material to the outside of the tubular material and continuing said rotating until the tubular material is completely severed.

In a preferred embodiment a tubular film is held stationary from at least the time of said piercing until at least the time that the tubular film is completely severed.

In a further preferred embodiment, the tubular materials, such as a sausage casing, is inflated to allow rapid penetration of the knife into the wall of the casing and to provide a space between the tubular film and the mandrel.

The invention further includes an apparatus for practicing the method of the invention.

The apparatus comprises:
1) a knife having an edge facing away from the mandrel,
2) a means for moving the knife so that it penetrates the tubular material,
3) a means for rotating the knife about the mandrel in a direction toward the knife edge to cut the tubular material from the inside of the tubular material to the outside of the tubular material, and
4) means for continuing the rotating and cutting until the tubular material is completely severed.

In a preferred embodiment the apparatus further comprises means to hold the tubular material stationary relative to a longitudinal axis of the mandrel at least from the time the knife penetrates the tubular material until the tubular material is completely severed. In one embodiment, the means for holding the tubular material stationary comprises nip rolls.

The apparatus further preferably includes means for inflating the tubular material to provide a space between the tubular material and the mandrel.

DETAILED DESCRIPTION OF THE INVENTION

The tubular materials which may be cut in accordance with the method and apparatus of the present invention are essentially any tubular materials which may be found upon a mandrel. "Mandrel" as used herein means essentially any insert within the tubular material. Such mandrels or inserts are usually, but not essentially, cylindrical in shape and are usually, but not necessarily, have a diameter of at least 75% of the diameter of the inside of the tubular material. Such mandrels may be made of almost any stable and usually rigid material such as plastics, metals and ceramics. In a preferred embodiment the mandrel is made of steel, which may be stainless steel. The tubular material may be of: essentially any plastic or plastic-like material such as regenerated cellulose; collagen; starches, such as arabinogalactan; polyolefins; such as polyethylene or polypropylene; halogenated polyolefins, such as polytetrafluoroethylene; polyamides; such as nylons e.g. nylon 6,6; polyvinylhalides such as polyvinyl chloride, and polyvinylidene chloride; woven and felted materials such as papers and fabrics; and composites of any of the above. In a preferred embodiment the tubular material is a sausage casing on the mandrel of a shirring (axial folding) machine.

The means for moving the knife can be any suitable means, e.g., pneumatic, mechanical, centrifugal, e.g., by gears, an air cylinder or a belt to a drive; electrical, e.g., using a solenoid activator or hydraulic.

Similarly the means for rotating the knife may be by any suitable means, such as gears, chains and sprockets, and belts and pulleys, connecting the rotating parts to any suitable drive such as an electrical, hydraulic or pneumatic motor.

The means for continuing the rotation and cutting may be any means such as continued activation of the means for rotation as previously described and means for maintaining the knife in the cutting position e.g. by continued activation of the knife moving means. Such means for continuing the rotation and cutting may also include inertial devices such as a flywheel or other rotary device.

The rotating means and means for moving the knife can be deactivated by any suitable means such as a switch or valve to stop activating or even reverse the means for moving the knife or the means for rotating the knife.

The method and apparatus of the present invention can be more readily understood by reference to the drawings which illustrate one embodiment of an apparatus of the invention.

Figure 5:
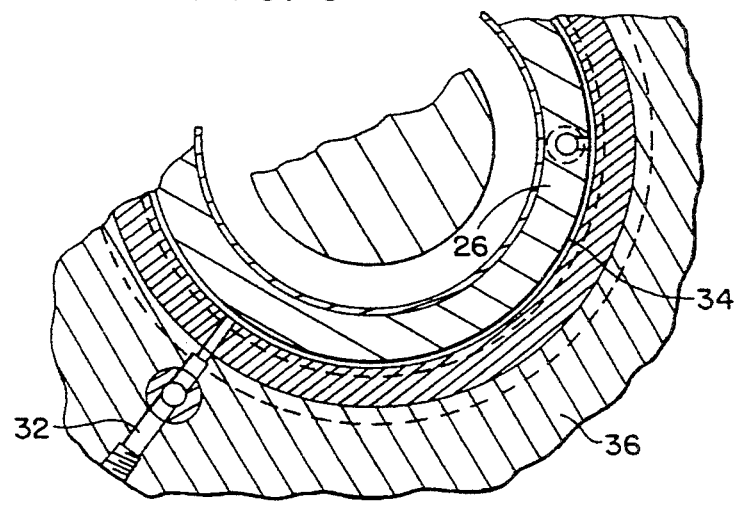
FIG. 5 is a cross sectional end view showing a compressed air path for operating the knife control air cylinder.
Figure 7:
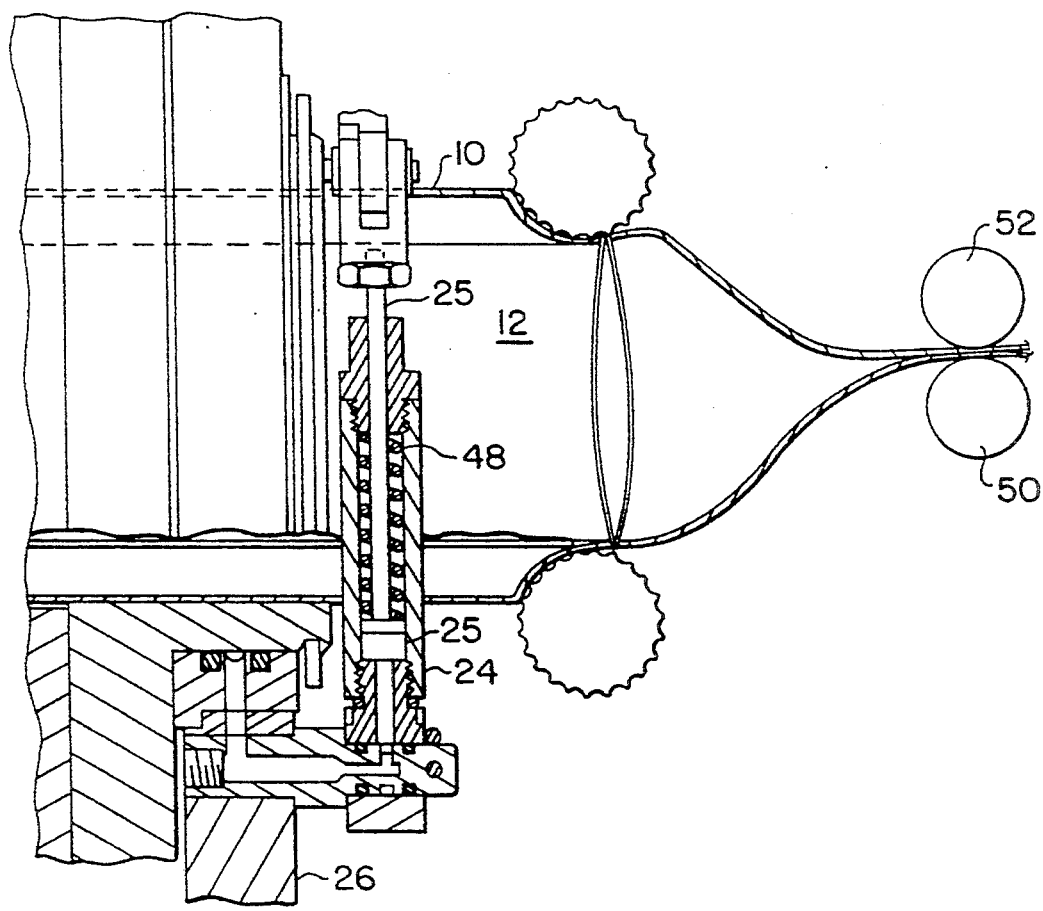
FIG. 7 is a cross sectional view taken on line 7—7 of FIG. 1.
Figure 8:
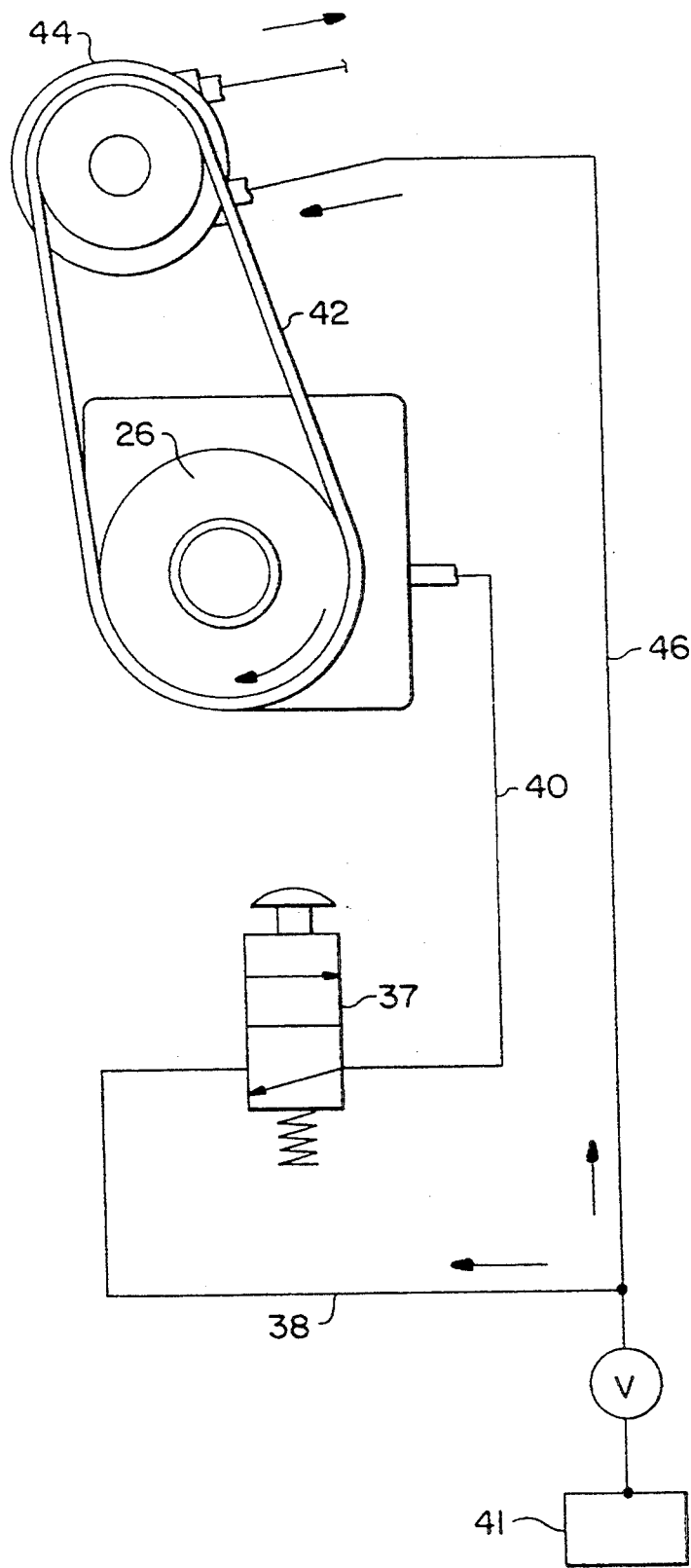
FIG. 8 is a pneumatic schematic diagram showing flow of air to operate the apparatus of FIG. 1.

As seen in the drawings, a tubular film 10 is slid over and encompasses a mandrel 12. A knife blade 14 is provided having an edge 16 and a back 18. Edge 16 faces away from mandrel 12. Knife blade 14 is rigidly attached by means of blade shank 20 to one end of lever arm 22. The opposite end of lever arm 22 is attached to the piston of pneumatic cylinder 24. The central portion of lever arm 22 is attached to fly wheel 26 at pivot 28. The housing portion of pneumatic cylinder 24 is similarly attached to flywheel 26 at pivot 30. As seen in FIG. 5 air may be supplied to cylinder 24 by means of inlet 32 and groove 34. Air may be controlled to cylinder 24 by means of a valve 37 which may be manually or automatically opened to permit air to flow through lines 38 and 40 to inlet 32 from a source 41. Flywheel 26 is rotationally mounted to frame 36 such that when flywheel 26 rotates, knife blade 14 rotates around mandrel 12. Flywheel 26 is driven by a belt 42 which is in turn driven by air motor 44. Air is supplied to motor 44 through line 46 which causes the motor to rotate which in turn moves belt 42 which turns flywheel 26.

When air is supplied to cylinder 24 by means previously described, piston and rod 25 is forced outward thus moving lever arm 22 so that knife blade 14 pieces casing 10. As the flywheel rotates, edge 16 of knife blade 14 cuts casing 10 from the inside out. Since edge 16 faces away from mandrel 12, edge 16 will not score the mandrel. The back 18 of the knife blade may actually rest on the mandrel and cause little or no damage when the knife is appropriately designed, e.g., with a soft resilient material at the back 18 of the knife.

When the tube is completely severed, pressure to cylinder 24 may be released by closing valve 36. Spring 48 then returns piston and rod 25 to its original position thus withdrawing knife blade 14.

In a preferred embodiment a means may be provided to hold the tubular film stationary during the cutting operation. Such a means may for example be nip rolls 50 and 52 which stop the advance of the casing when their rotation is stopped. In an additional preferred embodiment casing 10 is inflated to assist in piercing and cutting the tubular film 10 without contacting mandrel 12. Many such methods for supply gas pressure to the inside of the casing can be used as can be envisioned by those skilled in the art such as an air supply orifice 54 in mandrel 12 connected by suitable conduits to an air supply.

What is claimed is:

1. A method for severing tubular material around a rigid mandrel which comprises piercing the film with a knife such that the edge of the knife faces away from the mandrel and a portion of said edge is between said casing and said mandrel rotating the knife about the mandrel in a direction toward the knife edge while cutting the tubular material from inside of the tubular material to the outside of the tubular material and continuing said rotating at least until the tubular material is completely severed.

2. The method of claim 1 wherein the tubular material is a tubular film held stationary relative to the mandrel from at least the time of said piercing until at least the time that the tubular material is completely severed.

3. The method of claim 2 wherein the casing is inflated to provide a space between the tubular film and the mandrel.

4. An apparatus for severing tubular material around a rigid mandrel which comprises:
   1) a knife having an edge facing away from the mandrel,
   2) a means for moving the knife so that it penetrates the tubular material and a portion of said edge is between said casing and said mandrel,
   3) a means for rotating the knife about the mandrel in a direction toward the knife edge to cut the tubular material from the inside of the tubular material to the outside of the tubular material, and
   4) means for continuing the rotating and cutting at least until the tubular material is completely severed.

5. The apparatus of claim 4 wherein means is provided to hold the tubular material stationary relative to a longitudinal axis of the mandrel at least from the time the knife penetrates the tubular material until the tubular material is completely severed.

6. The apparatus of claim 5 wherein the means for holding the tubular material stationary comprises nip rolls.

7. The apparatus of claim 4 wherein means is provided for inflating the tubular material to provide a space between the tubular material and the mandrel.

* * * * *